United States Patent
Chen et al.

(10) Patent No.: US 9,935,816 B1
(45) Date of Patent: Apr. 3, 2018

(54) BORDER GATEWAY PROTOCOL ROUTING CONFIGURATION

(71) Applicant: Amazon Technologies, Inc., Seattle, WA (US)

(72) Inventors: Po-Chun Chen, Herndon, VA (US); Mark Edward Stalzer, Arlington, VA (US); Andrew Hemstreet Redmon, Centreville, VA (US)

(73) Assignee: Amazon Technologies, Inc., Seattle, WA (US)

( * ) Notice: Subject to any disclaimer, the term of this patent is extended or adjusted under 35 U.S.C. 154(b) by 297 days.

(21) Appl. No.: 14/741,188

(22) Filed: Jun. 16, 2015

(51) Int. Cl.
  *G06F 15/16* (2006.01)
  *H04L 12/24* (2006.01)
  *H04L 12/751* (2013.01)
  *H04L 12/713* (2013.01)

(52) U.S. Cl.
  CPC ...... *H04L 41/0206* (2013.01); *H04L 41/0816* (2013.01); *H04L 45/02* (2013.01); *H04L 45/586* (2013.01)

(58) Field of Classification Search
  USPC ....... 709/217, 221, 224, 225, 243, 249, 203, 709/206, 219, 223, 226, 228, 231, 232, 709/238; 370/216, 351, 401
  See application file for complete search history.

(56) References Cited

U.S. PATENT DOCUMENTS

| | | | | |
|---|---|---|---|---|
| 7,420,958 B1 * | 9/2008 | Marques | ............. | H04L 12/4675 370/351 |
| 7,529,254 B2 * | 5/2009 | Tsuge | ...................... | H04L 45/04 370/401 |
| 7,969,867 B2 * | 6/2011 | Rosen | ...................... | H04L 45/02 370/216 |
| 8,050,193 B2 * | 11/2011 | Accetta | .................... | H04L 45/04 709/224 |
| 8,065,438 B2 * | 11/2011 | Mehta | ...................... | H04L 45/04 709/249 |
| 8,837,275 B2 * | 9/2014 | Hofer | ...................... | H04L 45/04 709/221 |
| 8,861,345 B2 * | 10/2014 | Hares | ...................... | H04L 29/06 709/225 |
| 8,924,508 B1 * | 12/2014 | Medved | ........... | H04L 29/08072 709/217 |
| 8,937,961 B1 * | 1/2015 | Vairavakkalai | ......... | H04L 45/02 709/243 |
| 9,106,469 B1 * | 8/2015 | Miller | ............... | H04L 29/08144 |
| 9,225,624 B2 * | 12/2015 | Venkataswami | .... | H04L 41/0677 |
| 9,336,551 B1 * | 5/2016 | Hegg | ...................... | G06Q 30/08 |
| 9,654,482 B2 * | 5/2017 | Gagliano | .............. | H04L 63/108 |

\* cited by examiner

*Primary Examiner* — Quang N Nguyen
(74) *Attorney, Agent, or Firm* — Thorpe North & Western, LLP

(57) ABSTRACT

A technology is described for updating an Autonomous System Number (ASN) in a Border Gateway Protocol (BGP) routing configuration. An example method may include receiving a request to update a BGP routing configuration on a gateway with an ASN associated with a customer. In response to the request, the BGP routing configuration on the gateway may be updated to replace a default ASN associated with a computing service provider with the ASN associated with the customer. The BGP routing configuration on the gateway may also be updated to allow the ASN associated with the customer to appear in an Autonomous System (AS) path at least twice, thereby allowing for BGP routes to be exchanged between gateways.

20 Claims, 10 Drawing Sheets

500

| Name | Virtual Computing Environment ID | Status | CIDR |
|---|---|---|---|
| Corporate | 1575ALTAIR | Available | 10.0.0.0/16 |

Border Gateway Protocol (BGP) Settings 502

Public Autonomous System Number (ASN): AS7224

◉ Set Public ASN: [          ]  ( Save )

504

○ Set Private ASN: [          ]  ( Save )

506

○ Reset ASN to Default  ( Reset ASN )

BORDER GATEWAY PROTOCOL ROUTING CONFIGURATION

BACKGROUND

The Border Gateway Protocol (BGP) is a routing protocol used to route traffic across the Internet. BGP is an exterior gateway protocol used to exchange routing information among network routers in various autonomous systems. An autonomous system (AS) may have a collection of connected Internet Protocol (IP) routing prefixes under the control of one or more network operators on behalf of an administrative entity presenting a common routing policy to the Internet. Entities having an AS may register for and be assigned an autonomous system number (ASN) issued by an Internet registry authority (e.g., the American Registry for Internet Numbers (ARIN)). A unique ASN may be allocated to an AS for use in BGP routing.

BGP routing information may include a complete route to an AS system. A BGP system may use routing information to maintain a data store of network reachability that may be shared with other BGP configured systems. A BGP configured system may use the network reachability information to construct a graph of AS connectivity enabling a BGP configured system to remove routing loops and enforce policy decisions at an AS level. Companies and organizations operating an AS may interconnect their data centers or data processing centers with one or more virtual public and/or private computing environments (e.g., virtual cloud environment) provided by a computing service provider using BGP.

BRIEF DESCRIPTION OF THE DRAWINGS

FIG. 5 is a diagram illustrating an example user interface for updating BGP settings for a BGP routing configuration.

DETAILED DESCRIPTION

Figure 1:
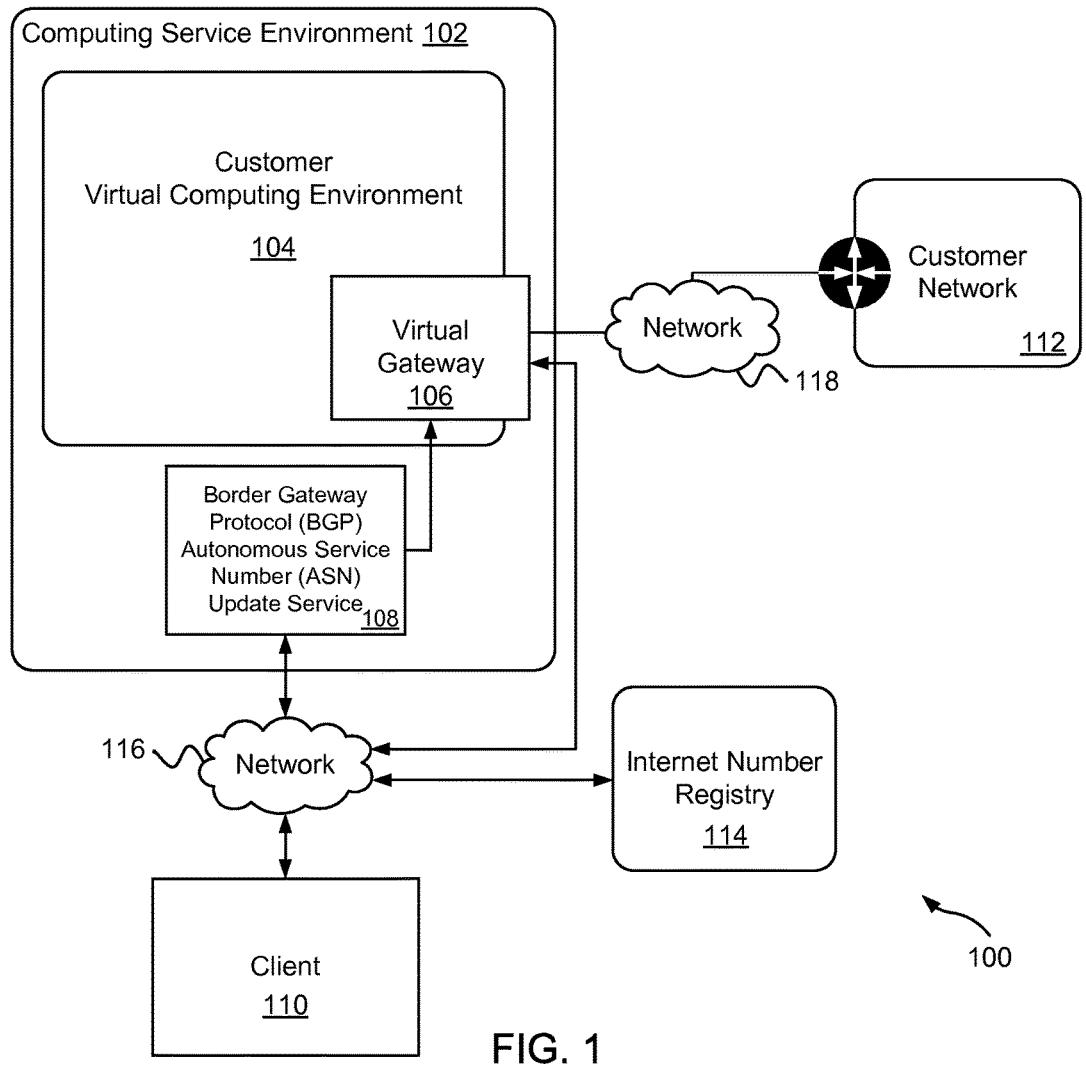
FIG. 1 is a block diagram illustrating an example system for updating a BGP routing configuration for a virtual gateway that controls access to a virtual computing environment.

A technology is described for updating a Border Gateway Protocol (BGP) routing configuration with an Autonomous System Number (ASN) associated with virtual gateways or virtual networking devices for a customer account. In one example, a BGP configured system operated by a computing service provider may utilize a default ASN that has been assigned to the computing service provider by an Internet registry authority (e.g., ARIN). A customer of the computing service provider may replace the default ASN in a BGP routing configuration with an ASN (e.g., a public ASN or private ASN) associated with the customer and an ASN capable of being used with the customer's virtual public and/or private computing environment (e.g., a virtual network that hosts virtualized computing resources for a customer account).

In one example configuration, a computing service provider may provide customers with an ASN Application Programming Interface (API) that allows customers to update a BGP routing configuration with an ASN provided by the customers. The ASN may be a private ASN or a public ASN. In the case that a customer provides a public ASN, verification of the public ASN may be performed to determine whether the public ASN is currently assigned to the customer by an Internet registry authority. In one example, an ASN lookup (e.g., http://whois.arin.net) may be used to query an Internet number registry to obtain information for the public ASN.

BGP routing configuration information may be updated using the ASN API to replace a default ASN representing the computing service provider with a public ASN assigned to a customer or a private ASN specified by the customer. The BGP routing configuration may be located on a virtual gateway (public gateway or private gateway) that controls access to a virtual computing environment hosted by the computing service provider or the BGP routing configuration may be located on a physical host for the virtual gateway device located within a computing service environment provided by the computing service provider. In addition to updating the BGP routing configuration with an ASN, the BGP routing configuration may be updated to allow the ASN to appear in an Autonomous System (AS) path at least twice, thereby allowing for BGP routes to be exchanged between ASes.

Prior to the present technology, a customer of a computing service provider has not had the ability to directly update the BGP routing configuration for a virtual computing environment hosted by a computing service provider. Namely, a customer could request that a virtual computing environment be created for the customer using an IP address specified by the customer, but the customer did not have access to a virtual gateway and/or other network routing devices used as part of a virtual computing environment to make BGP routing configuration changes. The present technology provides a customer with the ability to update a BGP routing configuration for the customer's virtual computing environment using APIs provided by a computing service provider. In one example scenario, a computing service provider may allow a customer to update a BGP routing configuration via a user interface that results in an API call that replaces a default ASN associated with the computing service provider with an ASN specified by the customer.

FIG. 1 is a block diagram illustrating a high level example of a system 100 used to update a BGP routing configuration for a virtual gateway 106. The system may include a BGP ASN update service 108 configured to provide customers of a computing service provider with the ability to update a BGP routing configuration with an ASN specified by the customer. The BGP ASN update service 108 may be located within a computing service environment 102 that hosts virtual computing environments 104 created on behalf of customers. Illustratively, a virtual computing environment may be a public or private "cloud environment" created on a customer's behalf Generally speaking, the computing service environment 102 that hosts the virtual computing environment 104 may offer Infrastructure as a Service ("IaaS"), Platform as a Service ("PaaS"), and/or Software as a Service ("SaaS").

As illustrated, a virtual computing environment 104 created on a customer's behalf may be connected via a network 118 to a customer network 112, thereby providing the customer network 112 access to the virtual computing environment 104 and extending the customer network 112. A customer network 112 may be, for example, a customer data center and/or a customer data processing center. In one example, the virtual computing environment 104 may be connected to the customer network 112 using a dedicated network connection that uses dedicated private network connections that do not use the Internet to send network traffic between the customer network 112 and the virtual computing environment 104. In another example, the virtual computing environment 104 may be connected to the customer network 112 using a Virtual Private Network (VPN) connection that utilizes Internet Protocol Security (IPSec) to establish encrypted network connectivity between the customer network 112 and the virtual computing environment 104 over the Internet.

Communications between the customer network 112 and the virtual computing environment 104 may be sent through a virtual gateway 106 that allows communications between components (e.g., computing instances) hosted in the virtual computing environment 104 and the customer network 112. The virtual gateway 106 may be configured to utilize BGP for routing network communications between the virtual computing environment 104, the customer network 112 and other external network (including the internet). A BGP routing configuration used by the virtual gateway 106 may include an ASN that identifies the computing service environment 102 as an autonomous system.

The creation of a virtual computing environment 104 on behalf of a customer account may result in the creation of a virtual gateway 106 for the virtual computing environment 104. The virtual gateway 106 may be configured to use a computing service provider's ASN (e.g., a public ASN registered to the computing service provider). Customers that advertise BGP routes out to the internet may advertise BGP routes that include a public ASN associated with the customer rather than advertising BGP routes that include the computing service provider's public ASN. Alternatively, customers may use a private ASN specified by the customers. As such, a customer that is in communication with the BGP ASN update service 108 via a client 110 using a network 116 may update a BGP routing configuration with a private or public ASN on a virtual gateway 106 used for the customer's virtual computing environment 104. While this technology has been described in terms of updating a virtual gateway 106, the ASN for virtualized edge routers, internal routers, or other routing network appliances may be modified.

In one example, customers may access the BGP ASN update service 108 via a user interface (e.g., a command line interface or a graphical user interface) and specify an ASN that will replace a default ASN in a BGP routing configuration. The customer may indicate whether the ASN is a public ASN or a private ASN. A private ASN may be used when an AS only communicates via BGP with a single destination network or within a customer's network, such that the routing policy between the AS and the provider will not be visible to the Internet. For example, a private ASN may be used when a customer network 112 communicates only with the virtual computing environment 104 and the routing policy is not advertised out to the Internet.

A public ASN may be used when an AS exchanges routing information with other ASes on the Internet. As a result, routes originating from an AS may be visible to other ASes on the Internet. In order to obtain a public ASN, an entity having an AS may apply for a public ASN by registering a public ASN from an Internet registry authority (e.g., ARIN) and the public ASN may be assigned to the AS. The entity having the AS may then advertise the public ASN in routing information exchanged with other ASes.

In the case that a customer specifies that an ASN is a private ASN which, for example, is to replace a default private ASN in a BGP routing configuration, the ASN specified by the customer may be evaluated to ensure that the private ASN adheres to private ASN standards. For example, the Internet Assigned Numbers Authority (IANA) has reserved ASN 64512 through to ASN 65535 to be used as private ASNs. As such, a private ASN specified by a customer may be evaluated to ensure that the private ASN falls within the designated range.

After evaluating the private ASN to ensure that the private ASN adheres to private ASN standards, the BGP routing configuration for a customer's virtual gateway 106 may be updated with the private ASN specified by the customer. In one example, an ASN API may be used to update the BGP routing configuration with a private or public ASN. The ASN API may be provided to customers that have virtual computing environments 104, allowing the customers to update a BGP routing configuration on the customer's virtual gateway 106 using API calls. In one example, the ASN API may include a parameter used to specify whether an ASN specified by a customer is a private ASN or a public ASN. In a graphical user interface configuration with a dashboard page for data entry, the ASN API may be called via a graphical user interface provided to customers of a computing service provider.

In the case that a customer specifies that an ASN is a public ASN used to replace a default public ASN in the BGP routing configuration, the public ASN specified by the customer may be verified to ensure that the public ASN is registered to the customer (e.g., an AS entity). For example, an ASN lookup API (e.g., http://whois.arin.net) may be used to retrieve information for the ASN from an Internet Number Registry 114 (e.g., ARIN). The information may include registration information for an entity that has been assigned the ASN. The registration information for the ASN may be compared with customer information obtained from a customer account to verify that the ASN is registered to the customer.

After verifying that the ASN is registered to the customer, the BGP routing configuration may be updated to replace the default public ASN assigned to the computing service provider with the public ASN registered to the customer. The ASN API described above may be called to update the BGP routing configuration with the public ASN registered to the customer, resulting in a default public ASN registered to the computing service provider to be replaced with the public ASN registered to the customer.

A BGP routing configuration may be further updated to allow an ASN to appear in an AS path at least twice, thereby allowing for BGP routes to be exchanged between the customer's AS and other ASes. Namely, allowing an ASN path to include an ASN more than once prevents a routing loop from being removed from BGP routing tables (e.g., when loop prevention is applied) and allows the BGP routing tables to be shared with other ASes.

To illustrate, setting an ASN in a BGP routing configuration of a customer's virtual gateway 106 with the ASN used in the customer's network 112 results in the creation of a routing loop. BGP uses a path-vector routing method designed to eliminate routing loops. More specifically, BGP routing messages include an AS path to each routing destination reachable by a BGP networking device. The AS path may be used to construct a graph of AS connectivity from which routing loops may be pruned. As a result, after updating a BGP routing configuration for a virtual gateway 106 with a customer's ASN, the customer's virtual computing environment 104 may become unreachable if the ASN is included in the AS path and a routing loop is created. To avoid BGP from pruning routing loops created as a result of updating the BGP routing configuration with a customer's ASN, the BGP routing configuration may be updated to allow an AS path to include the customer's ASN more than once.

As a specific example of route looping involving private ASNs, two or more customers of a computing service provider may update BGP routing configurations for the customer's virtual gateways 106 with identical private ASNs (e.g., 65000). As a result, routing loops may be created because the customers' identical private ASNs may be included in AS paths that are advertised out to networking devices included in the computing service environment 102. When received by the networking devices, the AS paths will be perceived as looped, despite the private ASNs being associated with separate customers. This is because an AS path acts as an anti-loop mechanism and networking devices may be configured to not import routes that contain an ASN in the AS path that is associated with the networking devices. By updating the BGP routing configuration for the networking devices to allow an AS path to include an ASN more than once, a loop switch may be set that allows the AS path to include the ASN at least twice.

Figure 2:
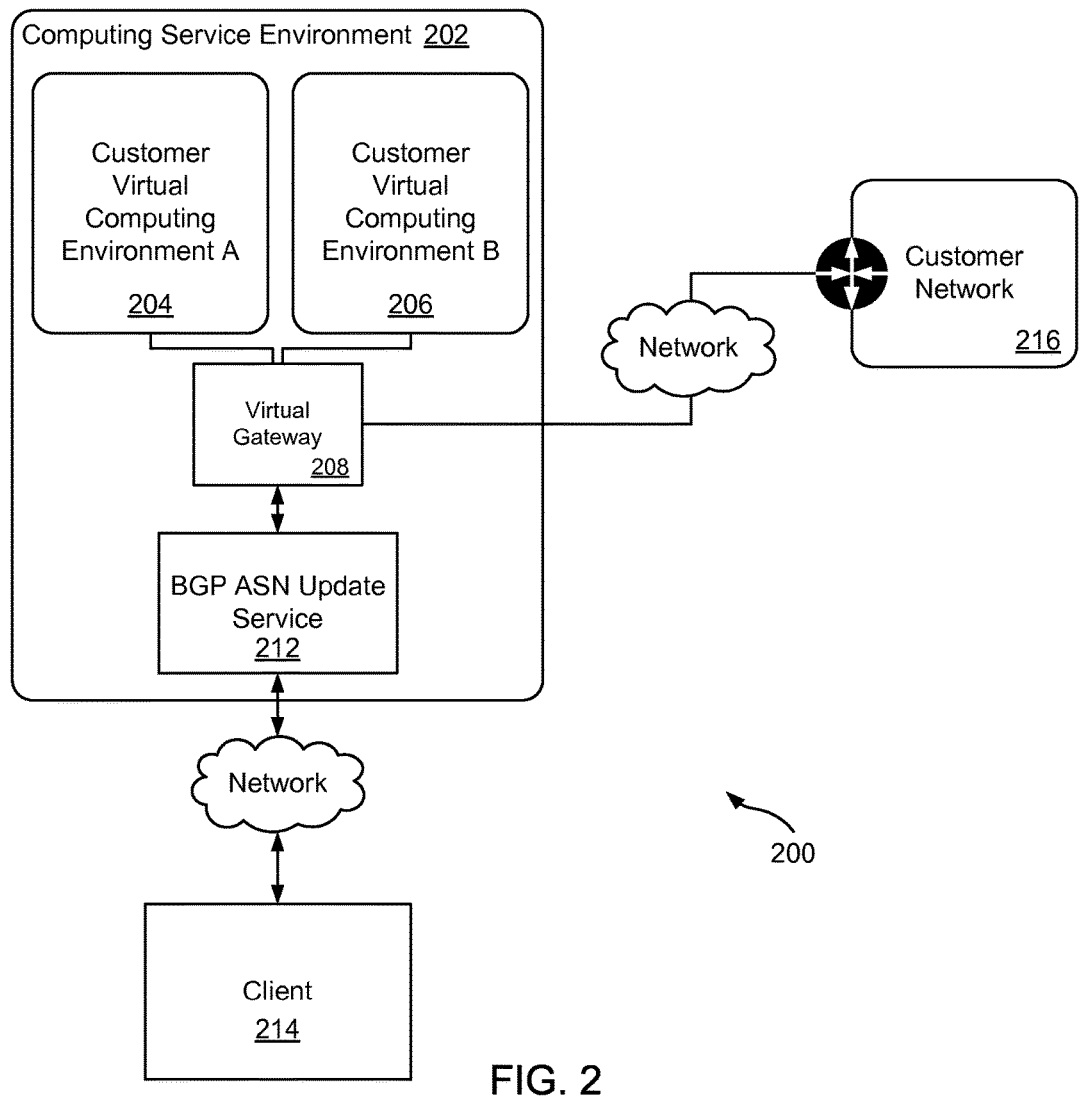
FIG. 2 is a block diagram that illustrates an example system for updating a BGP routing configuration for a virtual gateway that controls access to peered virtual computing environments.

FIG. 2 is a block diagram illustrating another high level example of a system 200 used to update a BGP routing configuration for a virtual gateway 208 used for peered virtual computing environments 204/206 hosted within a computing service environment 202. A virtual computing environment peering connection may be a network connection between two virtual computing environments 204/206 that enables network traffic to be routed between the two virtual computing environments 204/206 using private IP addresses.

In one example, the peered virtual computing environments 204/206 may be connected to the customer network 216 via a dedicated network connection or a VPN. As described in relation to FIG. 1, a customer using a client 214 may update BGP routing configurations for the customer's virtual gateway 208 with a private or public ASN using a BGP ASN update service 212. In addition, BGP routing configurations may be updated on any internal peer networking devices (e.g., virtualized networking devices) associated with providing the virtual computing environments 204/206. An API, in one example, may enable a customer to update BGP peering configurations related to a customer's virtual computing environments 204/206. As a specific example, the API may include a parameter that identifies a customer's virtual computing environment 204 or 206 and a parameter specifying an ASN that is to replace a default ASN. An example API call may look like: SetASN(String VirtualComputingEnvironment_ID, String ASN).

In one example, by updating a BGP routing configuration with a customer's ASN and updating the BGP routing configuration to allow an AS path to include the ASN more than once, the peered virtual computing environments 204/206 may be accessed through a routing loop. As a specific example, a computing service administrator may perform a data plane health check using two peered virtual computing environments 204/206 through a routing loop on a customer-facing network routing device.

Figure 3:
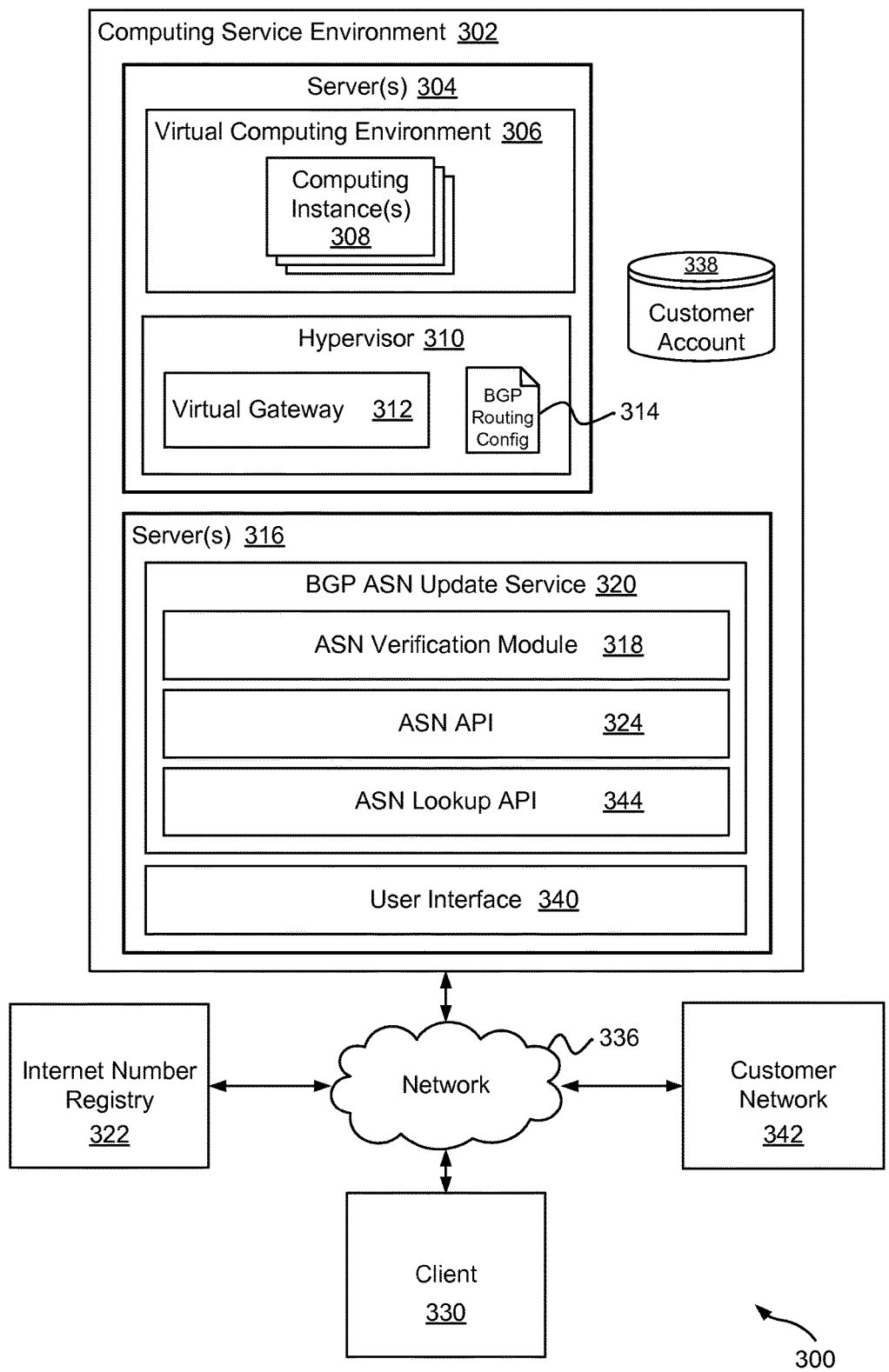
FIG. 3 is a block diagram that illustrates various example components included in a system for updating a BGP routing configuration with a customer specified ASN.

FIG. 3 illustrates components of an example system 300 on which the present technology may be executed. The system 300 may include a computing service environment 302 having a server 304 and a server 316. The server 304 may be configured to provide a customer with a virtual computing environment 306. A virtual computing environment 306 may include computing instances 308 (virtual computers) executed on server 304 hardware and managed using a hypervisor 310. As illustrated, a virtual gateway 312 may be located on the hypervisor 310. Illustratively, the virtual gateway (e.g., JUNIPER NETWORKS® vGW Series Virtual Gateway) may be loaded into the hypervisor 310 along with a virtual network interface controller (vNIC) and a virtual switch (vSwitch).

A virtual gateway 312 may allow communication between computing instances 308 hosted in the virtual computing environment 306 and a customer network 342 (via a dedicated network connection), or the Internet (via a VPN). The virtual gateway 312 may be configured to identify destination targets (e.g., a destination Classless Inter-Domain Routing (CIDR) and a target) in routing tables for Internet-routable traffic and perform network address translation (NAT) for computing instances 308 that have been assigned public IP addresses.

A separate server 316 may contain a BGP ASN update service 320 used to update a BGP routing configuration 314 for the virtual gateway 312. In one example configuration, the BGP ASN update service 320 may include an ASN verification module 318, an ASN API 324, and an ASN lookup API 344. A customer via a client 330, in one example, may access the BGP ASN update service 320 through a user interface 340 and update a BGP routing configuration 314 with a private or public ASN associated with a customer. In another example, an API (not shown) may be provided that allows customers to make API calls to the BGP ASN update service 320 to update a BGP routing configuration.

The ASN verification module 318 may be configured to verify that a public ASN is registered to a customer, and in some examples, may be configured to identify whether an ASN is a private ASN or a public ASN. In one example, an ASN may be evaluated to determine whether the value of the ASN is within a public ASN range or a private ASN range. In another example, an ASN API parameter may be used to specify whether an ASN submitted by a customer is a private ASN or a public ASN.

In the case that a parameter is used to indicate that an ASN is a private ASN, the ASN verification module 318 may be configured to evaluate the private ASN to ensure that the private ASN falls within a number range reserved for private ASNs by an Internet registry authority (e.g., the IANA). In the event that a private ASN submitted by a customer is valid, a BGP routing configuration 314 for the customer's virtual gateway 312 may be updated with the private ASN by calling the ASN API 324. In the event that a private ASN submitted by a customer does not fall within the number range reserved for private ASNs, the customer may be notified that the private ASN is invalid.

In the case that an ASN submitted by a customer is a public ASN, the ASN verification module 318 may be configured to query an Internet Number Registry 322 using an ASN lookup API 344 to obtain registration information for the public ASN. The registration information obtained from the Internet Number Registry 322 may identify an AS registered to use the ASN. More specifically, the registration information may include details for an organization associated with the AS registered to use the ASN. The ASN may be verified by obtaining customer details from a customer account 338 and comparing the customer details with the organization details to determine whether the customer details correspond with the organization details. If the customer details correspond with the organization details, then a determination may be made that the customer is registered to use the public ASN.

In the event that a public ASN registration submitted by a customer is verified, a BGP routing configuration 314 for the customer's virtual gateway 312 may be updated with the public ASN by calling the ASN API 324. In the event that the public ASN is not registered to the customer, the customer may be notified that the public ASN is invalid.

The ASN API 324 may be configured to update a BGP routing configuration 314 with a customer's private and/or public ASN. An API command may be submitted to a virtual gateway 312 that results in replacing a private or public ASN in a BGP routing configuration with a customer specified private or public ASN. Illustratively, an example ASN update API command for a vGW Juniper platform may be "set routing-instances VirtualGateway-001 protocols BGP group EBGP neighbor xx.xxx.x.x local-as xxxxx". ASNs may include 16-bit ASNs and/or 32-bit ASNs, and Internet protocol versions used by the system 300 may include Internet Protocol version 4 (IPv4) and/or Internet Protocol version 6 (IPv6).

The ASN API 324 may further be configured to update an AS path for a BGP routing configuration 314 to allow a customer specified ASN to appear in the AS path at least twice. As described earlier, a type of loop switch may be created that allows for BGP routes to be exchanged between ASes by allowing an AS path to include an ASN more than once. Illustratively, an example AS path API command for a vGW Juniper platform may be "set routing-instances VirtualGateway-001 protocols BGP group EBGP neighbor xx.xxx.x.x family inet unicast loops 2". In one example, an AS path may be updated to have a loop value of two or more as a result of updating a BGP routing configuration 314 with a customer specified ASN.

In one example configuration, a customer may reset a BGP routing configuration 314 back to a default configuration. The ASN API 324 may be configured to update a BGP routing configuration 314 with a default ASN associated with a computing service provider. For example, a customer may reset a BGP routing configuration 314 for the customer's virtual gateway 312 with a computing service provider's ASN. Further, as part of resetting the BGP routing configuration 314, the ASN API 324 may be configured to update an AS path in the BGP routing configuration 314 to only allow the default ASN to appear in the AS path once. As a result, the BGP routing configuration 314 may be restored to a computing service provider specified configuration.

A customer may utilize a client 330 to access a customer's virtual computing environment 306 and the BGP ASN update service 320. A client 330 may include any device capable of sending and receiving data over a network 336. A client 330 may comprise, for example a processor-based system such as a computing device. A client 330 may be a device such as, but not limited to, a desktop computer, laptop or notebook computer, tablet computer, mainframe computer system, handheld computer, workstation, network computer, or other devices with like capability.

The services and modules included in the system 300 may be accessed using API calls, procedure calls or other network commands according to different technologies. Communication between the client 330 and various components included in the computing service environment 302 may be performed using, but not limited to, Representational State Transfer (REST) technology or Simple Object Access Action (SOAP) technology. REST is an architectural style for distributed hypermedia systems. A RESTful API (which may also be referred to as a RESTful web service) is a web service API implemented using HTTP and REST technology. SOAP is an action for exchanging information in the context of Web-based services.

The various processes and/or other functionality contained within the system 300 may be executed on one or more processors that are in communication with one or more memory modules. The system 300 may include a number of computing devices that are arranged, for example, in one or more server banks or computer banks or other arrangements. The computing devices may support a computing environment using hypervisors, virtual machine monitors (VMMs) and other virtualization software. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 336 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 3 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 3 illustrates an example of a system that may implement the techniques above, many other similar or different environments are possible. The example environments discussed and illustrated above are merely representative and not limiting.

Figure 4A:
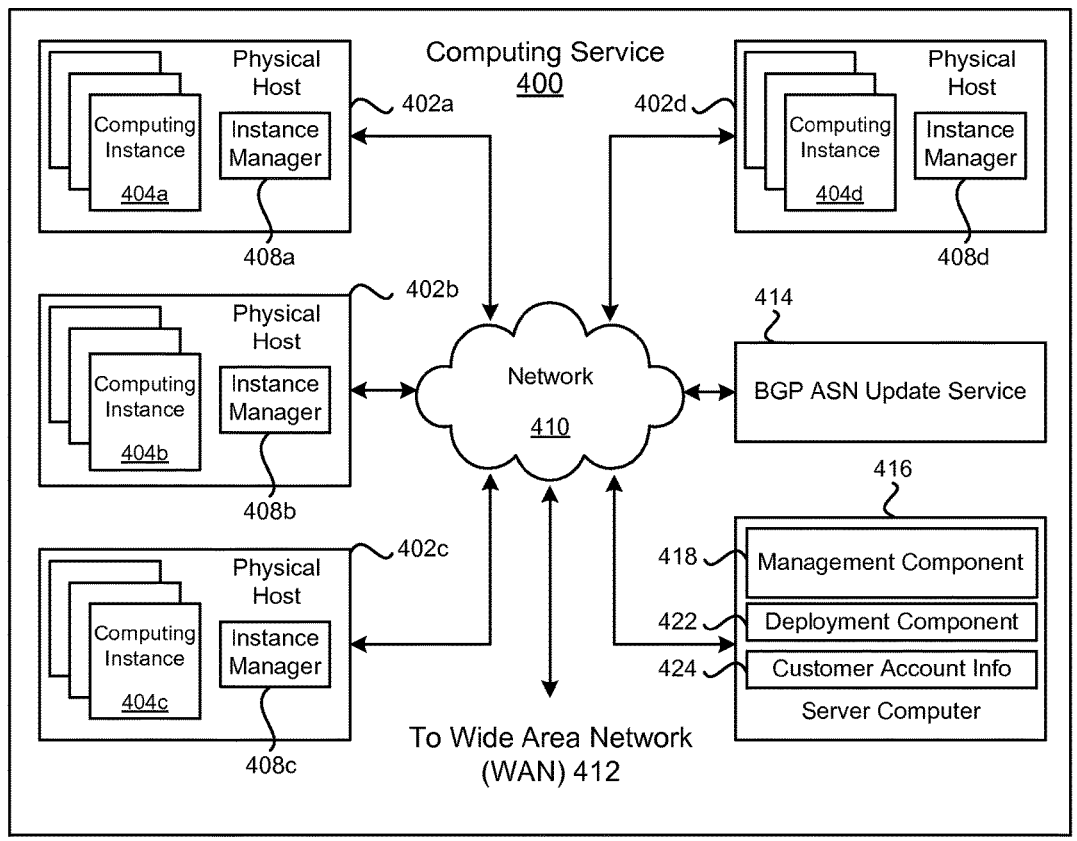
FIG. 4a is a block diagram that illustrates an example computing service environment that includes a BGP ASN update service.

FIG. 4a is a block diagram illustrating an example computing service 400 that may be used to execute and manage a number of computing instances 404a-d. In particular, the computing service 400 depicted illustrates one environment in which the technology described herein may be used. The computing service 400 may be one type of environment that includes various virtualized service resources that may be used, for instance, to host computing instances 404a-d.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Those familiar with the art will recognize that the computing service 400 may be described as a "cloud" environment.

The particularly illustrated computing service 400 may include a plurality of server computers 402a-d. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e. a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

One or more server computers 414 and 416 may be reserved to execute software components for managing the operation of the computing service 400 and the computing instances 404a-d. For example, a server computer 414 may execute a BGP ASN update service that may be used to modify a BGP routing configuration for a customer's network as described earlier.

A server computer 416 may execute a management component 418. A customer may access the management component 418 to configure various aspects of the operation of the computing instances 404a-d purchased by a customer. For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache should be prepared, and other types of information. The deployment component 422 may utilize the customer-provided configuration and cache logic to configure, prime, and launch computing instances 404a-d. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416. The network 410 may be a local area network (LAN) and may be connected to a Wide Area Network (WAN) 412 or the Internet, so that end customers may access the computing service 400. The network topology illustrated in FIG. 4a has been simplified, many more networks and networking devices may be utilized to interconnect the various computing systems disclosed herein.

Figure 4B:
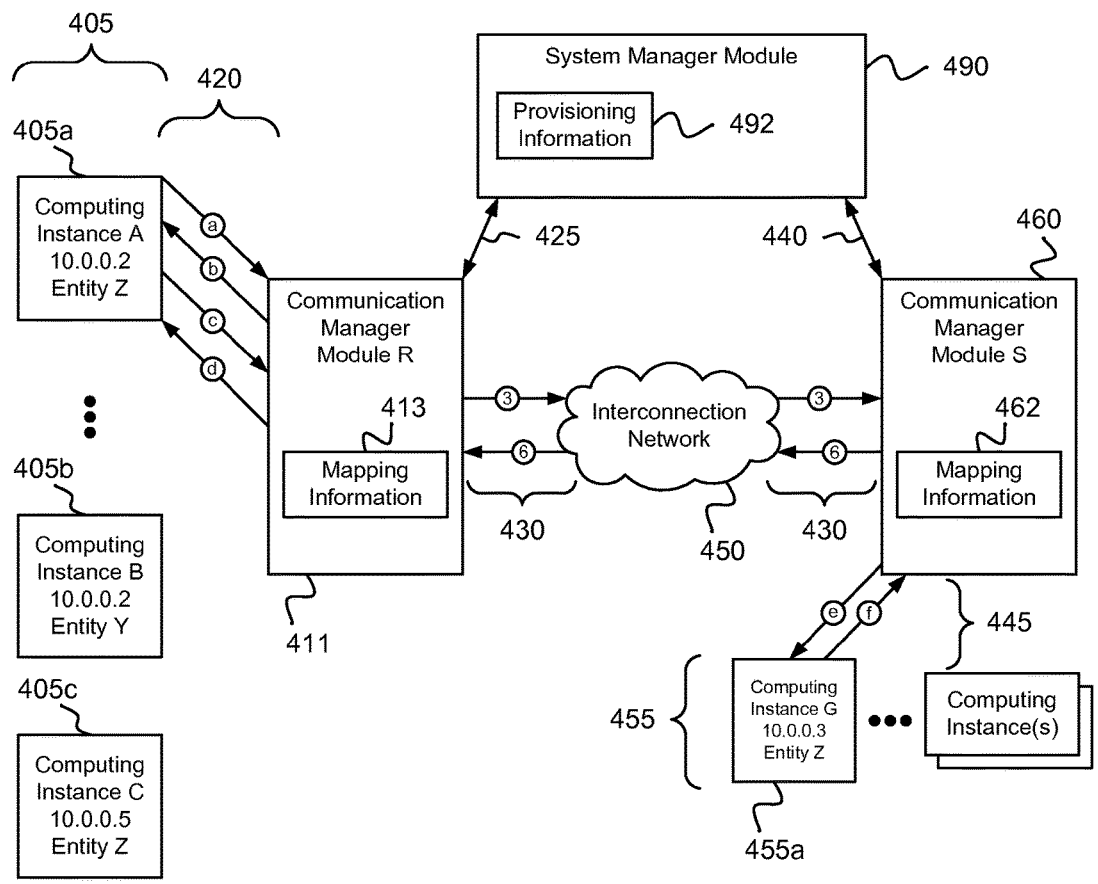
FIGS. 4b and 4c illustrate examples of managing communications between computing nodes that occur via a virtual computing environment.
Figure 4C:
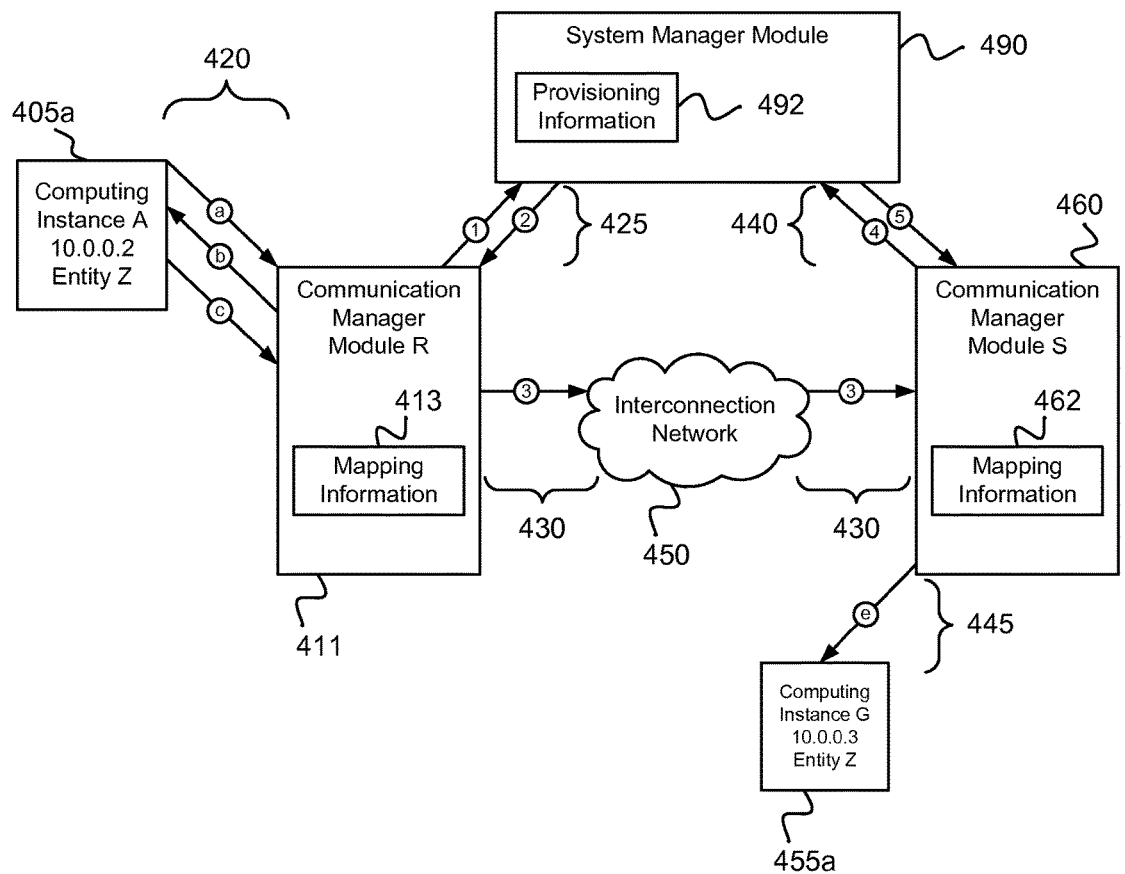

FIGS. 4b and 4c illustrate examples related to managing local communications between computing instances within a virtual computing environment, where the local communications occur via a virtual network overlaid on one or more physical computing networks. A computer network provided by a virtual computing environment may be a private computer network accessible by users on whose behalf the provided computer networks are created and configured (or by others for whom access is explicitly configured). For example, the virtual computing environment may provide a user with secure private access to a computer network, such as by enabling a dedicated network connection, a VPN connection or other secure connection between one or more remote computing systems and the provided computer network, or may use other security and/or authentication techniques to enable a client to remotely interact with the provided computer network in a private and secure manner. In addition, in at least some embodiments, at least some of the computer networks provided by the virtual computing environment may be created and configured by a customer to be an extension to an existing computer network of the customer, such as a private computer network extension to an existing remote private computer network of the customer (e. g., a remote corporate network of a customer that is a corporate entity).

FIG. 4b illustrates various example computing instances 405a-c and 455 that may communicate with each other over one or more intermediate interconnection networks 450. The computing instances 405 and 455 may be located on and executed by one or more host computing devices. In this example, the computing instances are operated on behalf of multiple distinct entities, such as multiple customers of a computing service, and a system manager module 490 manages the association of particular computing instances with particular entities and virtual computing environments. The example computing instances of FIG. 4b include three computing instances executed on behalf of an example entity Z (i.e., computing instances 405a, 405c and 455a). In addition, other computing instances are operated on behalf of other entities, such as computing instance 405b.

In this example, the computing instances 405 are managed by an associated communication manager module R 411, and the computing instances 455 are managed by an associated communication manager module S 460. The communication manager module R may be part of a hypervisor or virtual machine monitor for a host computing device.

Each of the communication manager modules of FIG. 4b are associated with a sub-network of multiple physical network addresses, which the communication manager modules 411 and 460 manage on behalf of the communication manager module's associated computing instances. The interconnection network 450 forwards any communication with a destination network address in that range to communication manager module R with the initial 72 bits of the range specified, the communication manager module R may use the remaining available 56 bits to represent the computing instances that the communication manager module R manages and to determine how to process incoming communications whose destination network addresses are in that range.

For purposes of the example shown in FIG. 4b, computing instances 405a, 405c and 455a are part of a single virtual local network for entity Z, and have assigned IPv4 network addresses of "10.0.0.2", "10.0.0.5" and "10.0.0.3", respectively (if written in dotted hexadecimal form, "10.0.0.2" would instead be "A.0.0.2"). Because computing instance 405b is part of a distinct virtual network for entity Y, the computing instance 405b can share the same virtual network address as computing instance 405a without confusion. In this example, computing instance A wants to communicate with computing instance G, which computing instance A believes is part of a common local physical network with computing instance A, as the interconnection network 450 and communication manager modules are transparent to computing instances A and G in this example. In particular, despite the physical separation of computing instances A and G, the communication manager modules 411 and 460 operate so as to overlay the virtual local network for entity Z over the physical interconnection network 450 for communications between those computing instances, so that the lack of an actual local network is transparent to the computing instances A and G. In this example, the physical interconnection network 450 is an IPv6 substrate network on which IPv4 virtual networks are overlaid.

In order to send the communication to computing instance G, computing instance A exchanges various messages 420 with communication manager module R, despite being unaware of the existence of communication manager module R. In particular, in this example, computing instance A first sends an ARP (Address Resolution Protocol) message request 420-a that includes the local network address for computing instance G (i.e., "10.0.0.3") and that requests the corresponding hardware address for computing instance G (e.g., a 48-bit MAC, or Media Access Control, address). Communication manager module R intercepts the ARP request 420-a, and responds to computing instance A with a spoofed ARP response message 420-b that includes a dummy virtual hardware address for computing instance G.

To obtain the dummy virtual hardware address for the response message, the communication manager module R first checks a local store 413 of information that maps dummy virtual hardware addresses to corresponding IPv6 actual physical network addresses, with each of the dummy virtual hardware addresses corresponding to an IPv4 virtual network address for a particular entity's virtual network. If the local store 413 does not contain an entry for computing instance G (e.g., if none of the computing instances 405 have previously communicated with computing instance G, if a prior entry in local store 413 for computing instance G has expired, etc.), the communication manager module R interacts 425 with system manager module 490 to obtain the corresponding actual IPv6 physical network address for computing instance G on behalf of computing instance A. In particular, in this example, the system manager module 490 maintains provisioning information 492 that identifies where each computing instance is actually located and to which entity and/or virtual network the computing instance belongs. As discussed in greater detail with respect to FIG. 4c, the system manager module 490 determines whether the request from communication manager module R on behalf of computing instance A for computing instances G's actual IPv6 physical network address is valid, including whether computing instance A is authorized to communicate with computing instance G, and if so provides that actual IPv6 physical network address.

Communication manager module R receives the actual IPv6 physical network address for computing instance G from the system manager module 490, and stores this received information as part of a new entry for computing instance G 455a as part of mapping information for later use (optionally with an expiration time and/or other information). In addition, Communication manager module R determines a dummy virtual hardware address to be used for computing instance G (e.g., by generating an identifier that is locally unique for the computing instances managed by communication manager module R), stores that dummy virtual hardware address in conjunction with the received actual IPv6 physical network address as part of the new mapping information entry, and provides the dummy virtual hardware address to computing instance A as part of response message 420-b. By maintaining such mapping information 413, later communications from computing instance A to computing instance G may be authorized by communication manager module R without further interactions with the system manager module 490, based on the use of the dummy virtual hardware address previously provided by communication manager module R.

After receiving the response message 420-b from communication manager module R, computing instance A creates and initiates the sending of a communication to computing instance G, shown in FIG. 4b as communication 420-c. In particular, the header of communication 420-c includes a destination network address for destination computing instance G that is "10.0.0.3", a destination hardware address for destination computing instance G that is the dummy virtual hardware address provided to computing instance A in message 420-b, a source network address for sending computing instance A that is "10.0.0.2", and a source hardware address for sending computing instance A that is an actual or dummy hardware address that was previously identified to computing instance A.

Communication manager module R intercepts the communication 420-c, modifies the communication as appropriate, and forwards the modified communication over the interconnection network 450 to computing instance G. In particular, communication manager module R extracts the virtual destination network address and virtual destination hardware address for computing instance G from the header, and then retrieves the IPv6 actual physical network address corresponding to that virtual destination hardware address from mapping information 413. Similarly, the communication manager module R extracts the virtual source network address and virtual source hardware address for computing instance A from the header of the received communication, obtains an IPv6 actual physical network address corresponding to that virtual source hardware address (e.g., from a stored entry in mapping information 413, by interacting with the system manager module 490 to obtain that information if not previously obtained, etc.), and includes that actual physical network address as the source network address for the new IPv6 header. The Communication manager module R then creates a new communication 430-3 by modifying communication 420-c so as to replace the prior IPv4 header with the new IPv6 header (e.g., in accordance with SIIT (Stateless IP/ICMP Translation)), including populating the new IPv6 header with other information as appropriate for the new communication (e.g., payload length, traffic class packet priority, etc.). Thus, the new communication 430-3 includes the same content or payload as prior communication 420-c, without encapsulating the prior communication 420-c within the new communication 430-3. Furthermore, access to the specific information within the payload is not needed for such re-headering, such as to allow communication manager module R to handle communications in which the payload is encrypted without needing to decrypt that payload.

After communication manager module R forwards the modified communication 430-3 to the interconnection network 450, the interconnection network uses the physical IPv6 destination network address of the communication to route the communication to communication manager module S. In doing so, the devices of the interconnection network 450 do not use the portion of the destination network address that includes the embedded entity network identifier or embedded virtual network address, and thus do not need any special configuration to forward such a communication, nor even awareness that a virtual network is being overlaid on the physical interconnection network.

When communication manager module S receives communication 430-3 via the interconnection network 450, it performs actions similar to those of communication manager module R, but in reverse. In particular, in at least some embodiments, the communication manager module S verifies that communication 430-3 is legitimate and authorized to be forwarded to computing instance G, such as via one or more interactions 440 with the system manager module. If the communication is determined to be authorized (or if the authorization determination is not performed), the communication manager module S then modifies communication 430-3 as appropriate and forwards the modified communication to computing instance G. Additional details related to the verification of the communication 430-3 are discussed with respect to FIG. 4c.

In particular, to modify communication 430-3, communication manager module S retrieves information from mapping information 462 that corresponds to computing instance G, including the virtual hardware address used by computing instance G (or generates such a virtual hardware address if not previously available, such as for a new computing instance). Communication manager module S then creates a new communication 445-e by modifying communication 430-3 so as to replace the prior IPv6 header with a new IPv4 header (e.g., in accordance with SIIT). The new IPv4 header includes the virtual network address and virtual hardware address for computing instance G as the destination network address and destination hardware address for the new IPv4 header, the virtual network address and a dummy virtual hardware address for computing instance A as the source network address and source hardware address for the new IPv4 header, and includes other information as appropriate for the new communication (e.g., total length, header checksum, etc.). Thus, the new communication 445-e includes the same content or payload as prior communication 420-c and 430-3. Communication manager module S then forwards new communication 445-e to computing instance G.

After receiving communication 445-e, computing instance G determines to send a response communication 445-f to computing instance A, using the source virtual network address and source virtual hardware address for computing instance A from communication 445-e. Communication manager module S receives communication 445-e, and processes it in a manner similar to that previously described with respect to communication 420-c and communication manager module R. In particular, communication manager module S optionally verifies that computing instance G is authorized to send communications to computing instance A, and then modifies communication 445-f to create communication 430-6 by generating a new IPv6 header using mapping information 462. After forwarding communication 430-6 to the interconnection network 450, the communication is sent to communication manager module R, which processes the incoming communication in a manner similar to that previously described with respect to communication 430-3 and communication manager module S. In particular, communication manager module R optionally verifies that computing instance G is authorized to send communications to computing instance A and that communication 430-6 actually was sent by computing instance G, and then modifies communication 430-6 to create communication 420-d by generating a new IPv4 header using mapping information 413. Communication manager module R then forwards communication 420-d to computing instance A.

FIG. 4c illustrates some of the computing instances and communications discussed with respect to FIG. 4b, but provides additional details with respect to some actions taken by the communication manager modules 411 and 460 and/or the system manager module 490 to authorize communications between computing instances. For example, after computing instance A sends message 420-a to request a hardware address for computing instance G, communication manager module R may perform one or more interactions 425 with the system manager module 490 in order to determine whether to provide that information, such as based on whether computing instance A is authorized to communicate with computing instance G, as well as to determine a corresponding substrate physical network address for computing instance G based on interconnection network 450. If the communication manager module R has previously obtained that information and it remains valid (e.g., has not expired), then the interactions 425 may not be performed. In this example, to obtain the desired physical network address corresponding to computing instance G, communication manager module R sends a message 425-1 to the system manager module 490 that includes the virtual network addresses for computing instances A and G, and that includes an entity network identifier for each of the computing instances A and G. After the system manager module 490 determines that computing instance A is authorized to communicate with computing instance G, the system manager module 490 returns a response message 425-2 that includes the desired actual physical network address corresponding to computing instance G. In addition, in at least some examples, before sending the desired actual physical network address, the system manager module 490 may further verify that communication manager module R is authorized to send the message 425-1 on behalf of computing instance A, such as based on computing instance A being one of the computing instance to which communication manager module R is associated.

As previously noted with respect to FIG. 4*b*, after communication manager module S receives communication 430-3 intended for computing instance G via the interconnection network 450, communication manager module S may perform one or more interactions 440 with the system manager module 490 in order to determine whether to authorize that communication. In particular, in this example, to verify that the communication 430-3 is valid and authorized to be forwarded to computing instance G, communication manager module S first extracts the actual IPv6 destination network address and actual IPv6 source network address from the header of communication 430-3, and then retrieves the embedded entity network identifiers and virtual network addresses from each of the extracted IPv6 network addresses. The communication manager module S next exchanges messages 440 with system manager module 490 to obtain the corresponding actual IPv6 physical network address for the sending computing instance A on behalf of computing instance G, including a message 440-4 that includes the extracted virtual network addresses for computing instances A and G and the entity network identifier for each of the computing instances.

The system manager module 490 receives message 440-4, and returns a response message 440-5 that includes the actual physical network address corresponding to computing instance A. As previously discussed with respect to messages 425-1 and 425-2, in some examples the system manager module 490 and/or communication manager module S may further perform one or more other types of authorization determination activities, such as to determine that computing instance G is authorized to communicate with computing instance A, that communication manager module S is authorized to send the message 440-4 on behalf of computing instance G, etc. Communication manager module S then verifies that the returned physical network address in message 440-5 matches the source IPv6 network address extracted from the header of communication 430-3, so as to prevent attempts to spoof messages as being from computing instance A that are actually sent from other computing instances in other locations. Communication manager module S optionally stores this received information in message 440-5 as part of an entry for computing instance A in mapping information 462 for later use, along with computing instance A's virtual network address and a dummy virtual hardware address for computing instance A.

Moving now to FIG. 5, the diagram illustrates an example user interface 500 that may be used to modify a BGP routing configuration for a customer's virtual computing environment. As illustrated, the user interface 500 may be used to display BGP settings 502 that can be modified by a customer. For example, the user interface may include BGP settings 502 for a public ASN 504 or for a private ASN 506 that can be modified by a customer.

In the illustrated user interface 500, BGP settings 502 for a public ASN 504 may include information about a current public ASN (e.g., a default public ASN), and a public ASN field that enables a customer to enter a public ASN registered to the customer.

BGP settings 502 for a private ASN 506 can be modified via the user interface 500. Information for a current private ASN may be displayed in the user interface 500. Customers may modify a private ASN with a private ASN selected by the customer. BGP settings 502 can be reset to a default ASN (e.g., an ASN associated with a computing service provider) via a user interface control 508 that enables the customer to reset a BGP configuration back to a computing service provider default configuration. Changes made to the BGP settings 502 using the user interface 500 may be applied to a respective BGP routing configuration using one or more APIs that may be called as a result modifying the BGP settings 502 in the user interface 500.

Figure 6:
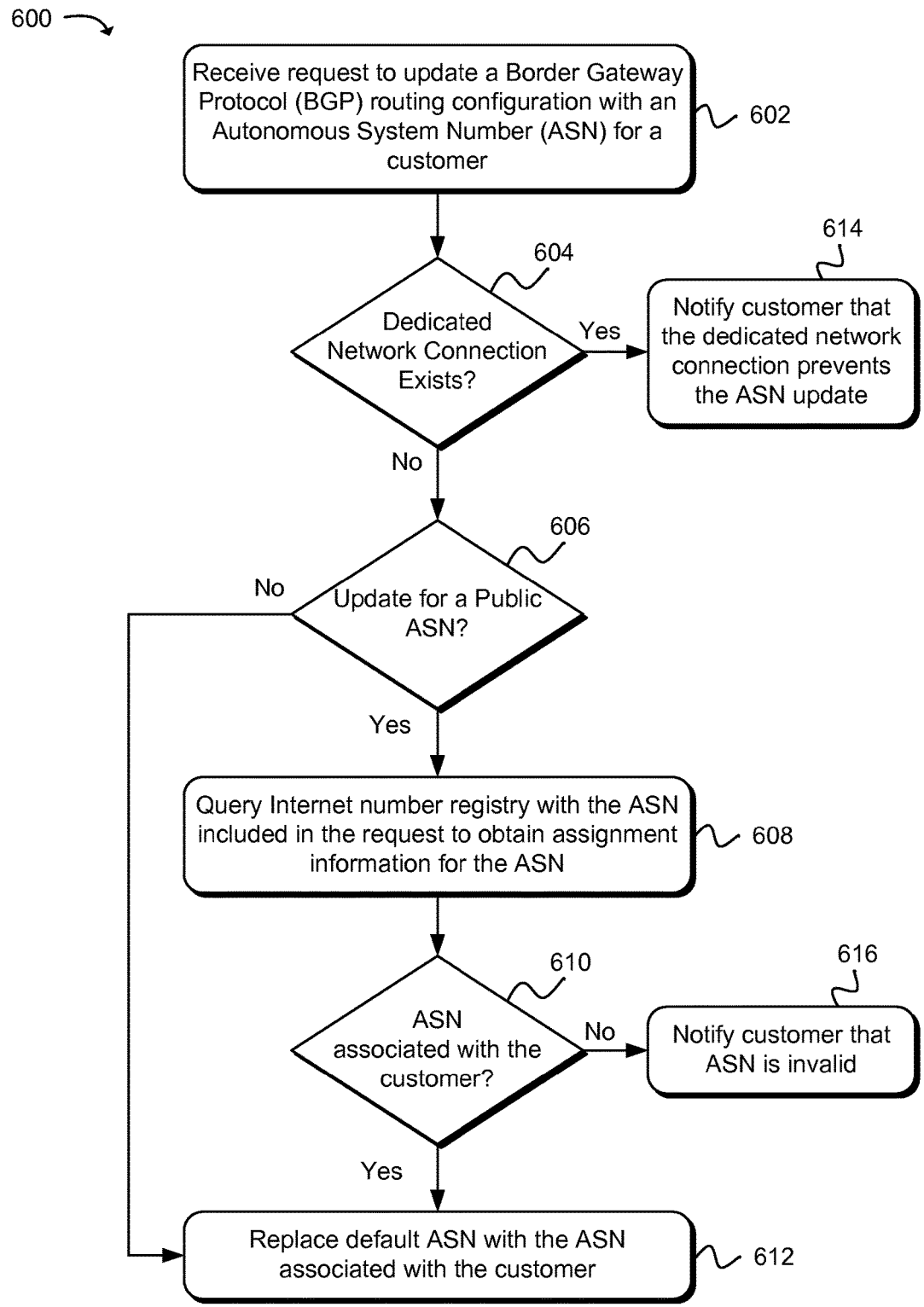
FIG. 6 is a flow diagram illustrating an example method for modifying a BGP routing configuration with a customer specified ASN.

FIG. 6 is a flow diagram illustrating an example method 600 for modifying a BGP routing configuration with a customer specified ASN. Beginning in block 602, a request may be received to update a BGP routing configuration with an ASN associated with a customer having a customer account with a computing service provider. The customer may have a virtual computing environment hosted by the computing service provider.

In receiving the request, as in block 604, a determination may be made whether a dedicated network connection is used to connect the customer's virtual computing environment with a customer network. A dedicated network connection may use a dedicated private network connection to send network traffic between the customer's virtual computing environment and the customer network. In the case that a dedicated network connection exists, as in block 614, the customer may be notified that the dedicated network connection prevents the BGP routing configuration from being updated with the customer's ASN. For example, updating the BGP routing configuration with a customer's ASN while a dedicated network connection exists may result in destroying existing BGP sessions, thereby causing a network traffic interruption for the customer's virtual computing environment.

In the case that a dedicated network connection does not exist, then as in block 606, an ASN submitted by the customer may be identified as a private or public ASN. For example, the value of the ASN may be evaluated to determine whether the value falls within a private ASN range or a public ASN range. In the case that the ASN is a private ASN, then as in block 612, the BGP routing configuration may be updated to replace a default private ASN with the customer specified private ASN.

In the case that the ASN is a public ASN, then as in block 608, an Internet number registry may be queried to obtain registration information for the ASN. As in block 610, the registration information for the public ASN may be compared with customer information obtained from a customer account to determine whether the public ASN is registered to the customer.

In the event that the registration information obtained from the Internet number registry indicates that the public ASN is not registered to the customer, then as in block 616, the customer may be notified that the public ASN submitted by the customer is invalid. In the event that the registration information indicates that the public ASN is registered to the customer, then as in block 612, the BGP routing configuration may be updated to replace a default public ASN with the public ASN submitted by the customer.

Figure 7:
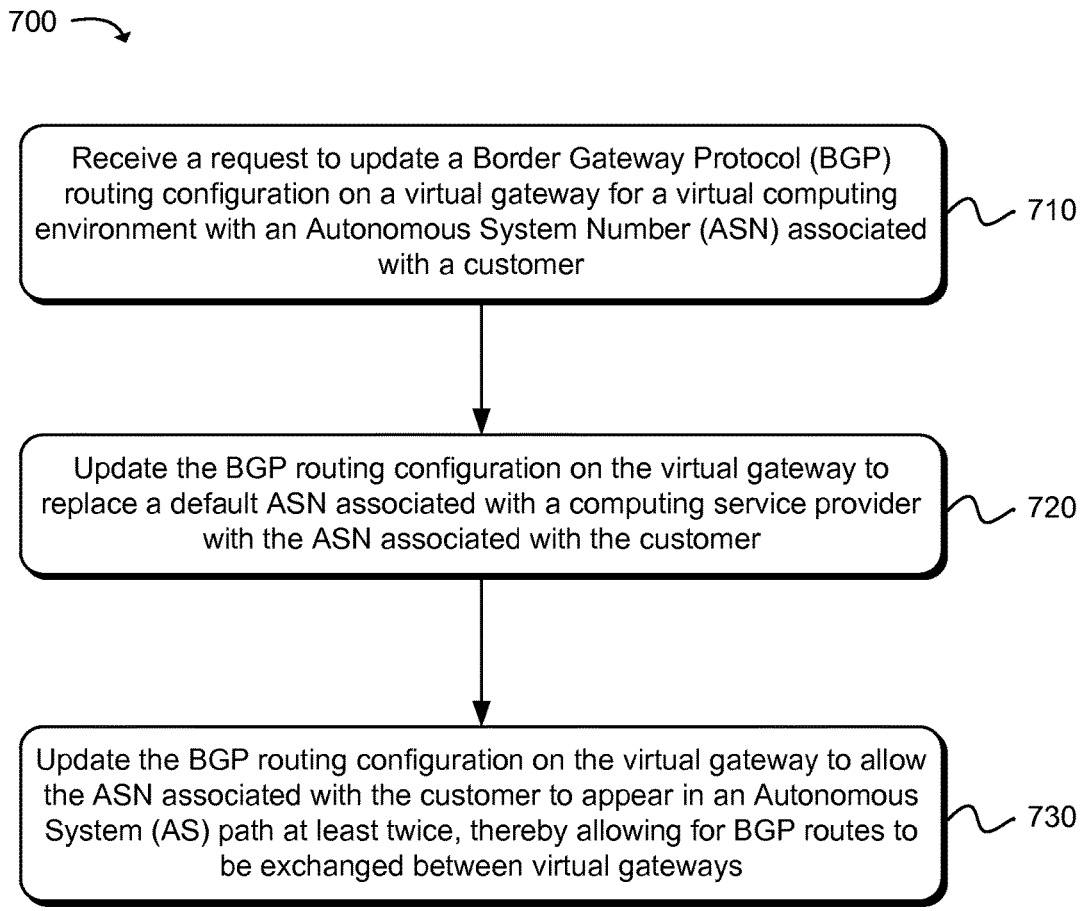
FIG. 7 is a flow diagram that illustrates an example method for updating a BGP routing configuration for a virtual gateway with an ASN associated with a customer.

FIG. 7 is a flow diagram that illustrates an example method 700 for updating a BGP routing configuration for a virtual gateway with an ASN associated with a customer. Starting in block 710, a request may be received to update a BGP routing configuration on a virtual gateway for a virtual computing environment with an ASN associated with a customer having a customer account with a computing service provider. In one example, the request may be to update the BGP routing configuration with a public ASN assigned to the customer by an Internet registry authority. In the case that the ASN is a public ASN, an ASN lookup tool may be used to verify that the public ASN is registered to the customer. In another example, the request may be to update the BGP routing configuration with a private ASN for the customer.

As in block 720, the BGP routing configuration on the virtual gateway may be updated to replace a default ASN associated with a computing service provider with the ASN associated with the customer. In one example, BGP routing configurations on internal peer networking devices (e.g., virtual network devices) associated with providing a virtual computing environment for the customer account may also be updated.

As in block 730, the BGP routing configuration on the virtual gateway may be updated to allow the ASN associated with the customer to appear in an AS path at least twice, thereby allowing for BGP routes to be exchanged between virtual gateways. As such, a loop switch may be created that allows the AS path to include the ASN at least twice, preventing routing loops created as a result of updating the BGP routing configuration with the ASN to be removed from BGP routing tables.

Figure 8:
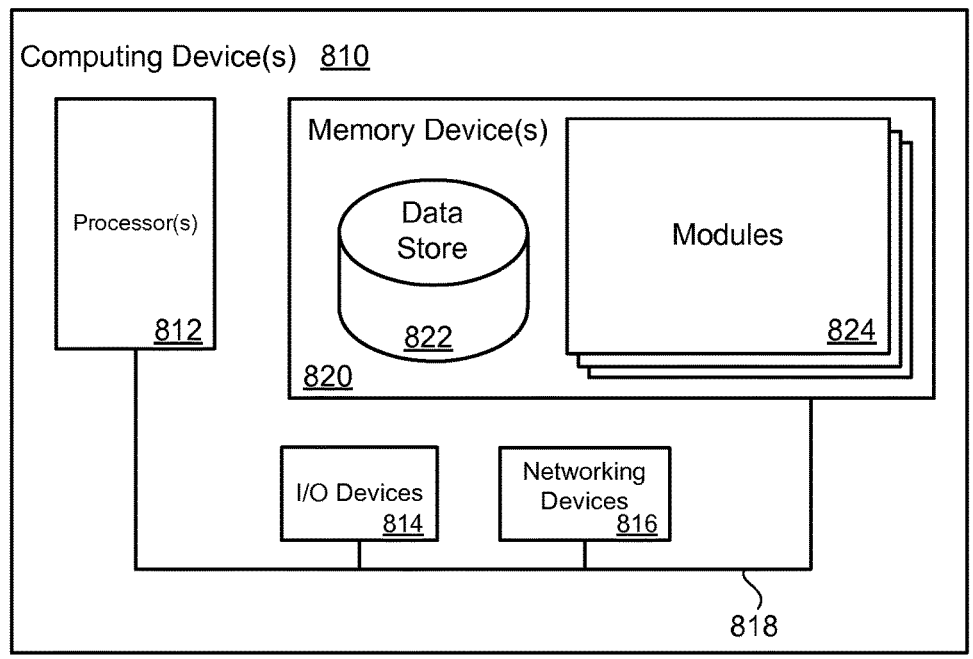
FIG. 8 is block diagram illustrating an example of a computing device that may be used to execute a method for modifying a BGP routing configuration with a customer specified ASN.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 that are executable by the processor(s) 812 and data for the modules 824. For example, the memory device 820 may contain a BGP ASN module, an ASN verification module, as well as other modules. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed by a processor:
   receive a request to update a Border Gateway Protocol (BGP) routing configuration on a virtual gateway for a virtual computing environment and to replace a first Autonomous System Number (ASN) assigned to a computing service provider with a second ASN associated with a customer, where the first ASN and the second ASN are public ASNs assigned by an Internet registry authority;
   verify that the second ASN is registered to the customer using an ASN lookup;
   initiate an update to the BGP routing configuration on the virtual gateway to replace the first ASN assigned to the computing service provider with the second ASN assigned to the customer; and
   initiate an update to the BGP routing configuration on the virtual gateway to allow the second ASN to appear in an Autonomous System (AS) path at least twice, thereby allowing for BGP routes to be exchanged between virtual gateways.

2. A non-transitory machine readable storage medium as in claim 1, wherein the instructions that when executed by the processor further update BGP routing configurations on internal peer networking devices associated with providing the virtual computing environment for a customer account.

3. A non-transitory machine readable storage medium as in claim 1, wherein the instructions that when executed by the processor further update the BGP routing configuration on the virtual gateway to restore the BGP routing configuration to use a default ASN assigned to the computing service provider as a result of a request associated with a customer account.

4. A computer implemented method, comprising:
   receiving a request to update a Border Gateway Protocol (BGP) routing configuration on a virtual gateway for a virtual computing environment with an Autonomous System Number (ASN) associated with a customer;
   initiating an update to the BGP routing configuration on the virtual gateway to replace a default ASN associated with a computing service provider with the ASN associated with the customer; and
   initiating an update to the BGP routing configuration on the virtual gateway to allow the ASN associated with the customer to appear in an Autonomous System (AS) path at least twice, thereby allowing for BGP routes to be exchanged between virtual gateways.

5. A method as in claim 4, wherein receiving the request to update the BGP routing configuration on the gateway with the ASN further comprises, receiving a request to update the ASN with a public ASN assigned to the customer by an Internet registry authority.

6. A method as in claim 4, further comprising verifying that the ASN associated with the customer is registered to the customer using an ASN lookup as a result of the request being a request to update the ASN with a public ASN assigned to the customer by an Internet registry authority.

7. A method as in claim 6, further comprising:
querying an Internet routing registry maintained by an Internet registry authority with the public ASN using an Application Programming Interface (API) provided by the Internet registry authority; and
receiving ASN information for the public ASN from the Internet routing registry that is used to verify that the public ASN is assigned to the customer by the Internet registry authority, wherein the BGP routing configuration on the gateway is updated as a result of the ASN information specifying that the public ASN is assigned to the customer.

8. A method as in claim 4, wherein receiving the request to update the BGP routing configuration on the gateway with the ASN further comprises, receiving a request to update the ASN with a private ASN for the customer.

9. A method as in claim 4, wherein receiving the request to update the BGP routing configuration on the gateway with the ASN further comprises: receiving the request via an ASN API provided by the computing service provider that allows a customer to submit the ASN associated with the customer used to replace the default ASN associated with the computing service provider in the BGP routing configuration.

10. A method as in claim 9, wherein an API call made using the ASN API includes a parameter used to specify whether the ASN associated with the customer is a private ASN for the customer or a public ASN assigned to the customer by an Internet registry authority.

11. A method as in claim 4, further comprising receiving a request via an ASN API provided by the computing service provider that allows a customer to request that the BGP routing configuration on the gateway be reset by replacing the ASN associated with the customer with the default ASN associated with the computing service provider.

12. A method as in claim 4, further comprising connecting a customer network to a service provider network via a dedicated network connection that utilizes BGP, where the dedicated network connection is provided by the computing service provider.

13. A method as in claim 4, further comprising determining whether a dedicated network connection that connects a customer network to a service provider network exists prior to updating an ASN in the BGP routing configuration, thereby preventing a network traffic interruption caused by destroying existing BGP sessions resulting from updating the ASN in the BGP routing configuration.

14. A method as in claim 13, further comprising notifying a customer associated with a customer account that the dedicated network connection is preventing the ASN in the BGP routing configuration from being updated.

15. A method as in claim 4, further comprising connecting the virtual computing environment for a customer account executing in a service provider network with a customer network using a gateway that utilizes BGP.

16. A method as in claim 4, further comprising peering a first virtual computing environment for a customer account with a second virtual computing environment for the customer account, where the peering utilizes BGP and the first virtual computing environment and the second virtual computing environment are executed within a computing service provider environment.

17. A method as in claim 4, wherein the ASN is a 16-bit value or a 32-bit value.

18. A system comprising:
a processor;
a memory device including instructions that, when executed by the processor, cause the system to:
receive a request to update a Border Gateway Protocol (BGP) routing configuration on a virtual gateway to replace a first Autonomous System Number (ASN) associated with a computing service provider with a second ASN associated with a customer;
update the BGP routing configuration on the virtual gateway via an ASN Application Programming Interface (API) to replace the first ASN assigned to the computing service provider with the second ASN assigned to the customer; and
update the BGP routing configuration on the virtual gateway via the ASN API to allow the second ASN to appear in an Autonomous System (AS) path at least twice, thereby allowing for BGP routes to be exchanged between virtual gateways.

19. A system as in claim 18, wherein the memory device includes instructions that, when executed by the processor, causes the system to generate a graphical user interface that enables a customer to specify the second ASN associated with the customer and to specify whether the second ASN is a private ASN associated with the customer or a public ASN assigned by an Internet registry authority.

20. A system as in claim 18, wherein the memory device includes instructions that, when executed by the processor, causes the system to verify that the second ASN is registered to the customer as a result of the request to update the first ASN with a public ASN assigned to the customer by an Internet registry authority.

* * * * *